(12) United States Patent
Ahmed et al.

(10) Patent No.: US 10,140,151 B2
(45) Date of Patent: Nov. 27, 2018

(54) LEVERAGING DIRECTED ACYCLIC GRAPH (DAG) INFORMATION TO GROUP TASKS FOR EXECUTION

(71) Applicant: INTERNATIONAL BUSINESS MACHINES CORPORATION, Armonk, NY (US)

(72) Inventors: Khalid Ahmed, Markham (CA); Kuan Feng, Thornhill (CA); Junfeng Liu, Richmond Hill (CA); Hai Long W. Wen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/491,060

(22) Filed: Apr. 19, 2017

(65) Prior Publication Data
US 2018/0307528 A1    Oct. 25, 2018

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01)

(58) Field of Classification Search
CPC .................................................. G06F 9/4881
See application file for complete search history.

(56) References Cited

U.S. PATENT DOCUMENTS

| 2014/0075161 A1* | 3/2014 | Zhang ............... G06F 8/453 712/220 |
| 2015/0227389 A1 | 8/2015 | Chin et al. |
| 2017/0169336 A1* | 6/2017 | Singhal ............. G06F 17/30958 |

OTHER PUBLICATIONS

Groot, "Modeling I/O Interterence in Data Intensive Map-Reduce Applications," Applications and the Internet (SAINT), IEEE/IPSJ 12th International Symposium, Jul. 2012 (4 pages).
Zheng et al., "Optimizing MapReduce Framework through Joint Scheduling of Overlapping Phases," Proceedings of the 25th IEEE International Conference, 2016 (9 pages).

* cited by examiner

*Primary Examiner* — Charlie Sun
(74) *Attorney, Agent, or Firm* — Griffiths & Seaton PLLC

(57) ABSTRACT

Embodiments for leveraging directed acyclic graph (DAG) information to group tasks for execution, by at least one processor device. For a set of tasks, an input host set is determined for each task using a shuffle type and hosts used during a previous stage, and the tasks in the set of tasks determined to be within a same input host set are classified together. An Input/Output (I/O) cost for each task in the set of tasks is calculated and tasks within the set of tasks are grouped into task groups according to an applied allocation time. The task groups are launched commensurate with a calculated delay time from each input host set so as to overlap I/O phases and central processing unit (CPU) phases to improve CPU efficiency, the launched task groups being executed by an executor according to the calculated delay time.

21 Claims, 7 Drawing Sheets

LEVERAGING DIRECTED ACYCLIC GRAPH (DAG) INFORMATION TO GROUP TASKS FOR EXECUTION

BACKGROUND OF THE INVENTION

Field of the Invention

The present invention relates in general to computing systems, and more particularly to, various embodiments for grouping and executing tasks in distributed computing environments.

Description of the Related Art

In today's interconnected and complex society, computers and computer-driven equipment are more commonplace. When performing compute-intensive workloads such as data analytics, an effective framework involves distributed parallel computing, which operates to disperse processing tasks across multiple processors operating on one or more computing devices such that parallel processing may be executed simultaneously. One platform for executing complex multi-stage applications and tasks, such as machine learning algorithms, graph processing, and other analytical algorithms is Apache Spark™ (or simply, Spark™).

SUMMARY OF THE INVENTION

Various embodiments for leveraging directed acyclic graph (DAG) information to group tasks for execution, by at least one processor device, are provided. In one embodiment, by way of example only, a method comprises, for a set of tasks, determining an input host set for each task using a shuffle type and hosts used during a previous stage; wherein tasks in the set of tasks determined to be within a same input host set are classified together; dynamically calculating an Input/Output (I/O) cost for each task in the set of tasks and grouping tasks within the set of tasks into task groups according to an applied allocation time; and launching the task groups commensurate with a calculated delay time from each input host set so as to overlap I/O phases and central processing unit (CPU) phases to improve CPU efficiency; wherein the launched task groups are executed by an executor according to the calculated delay time.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
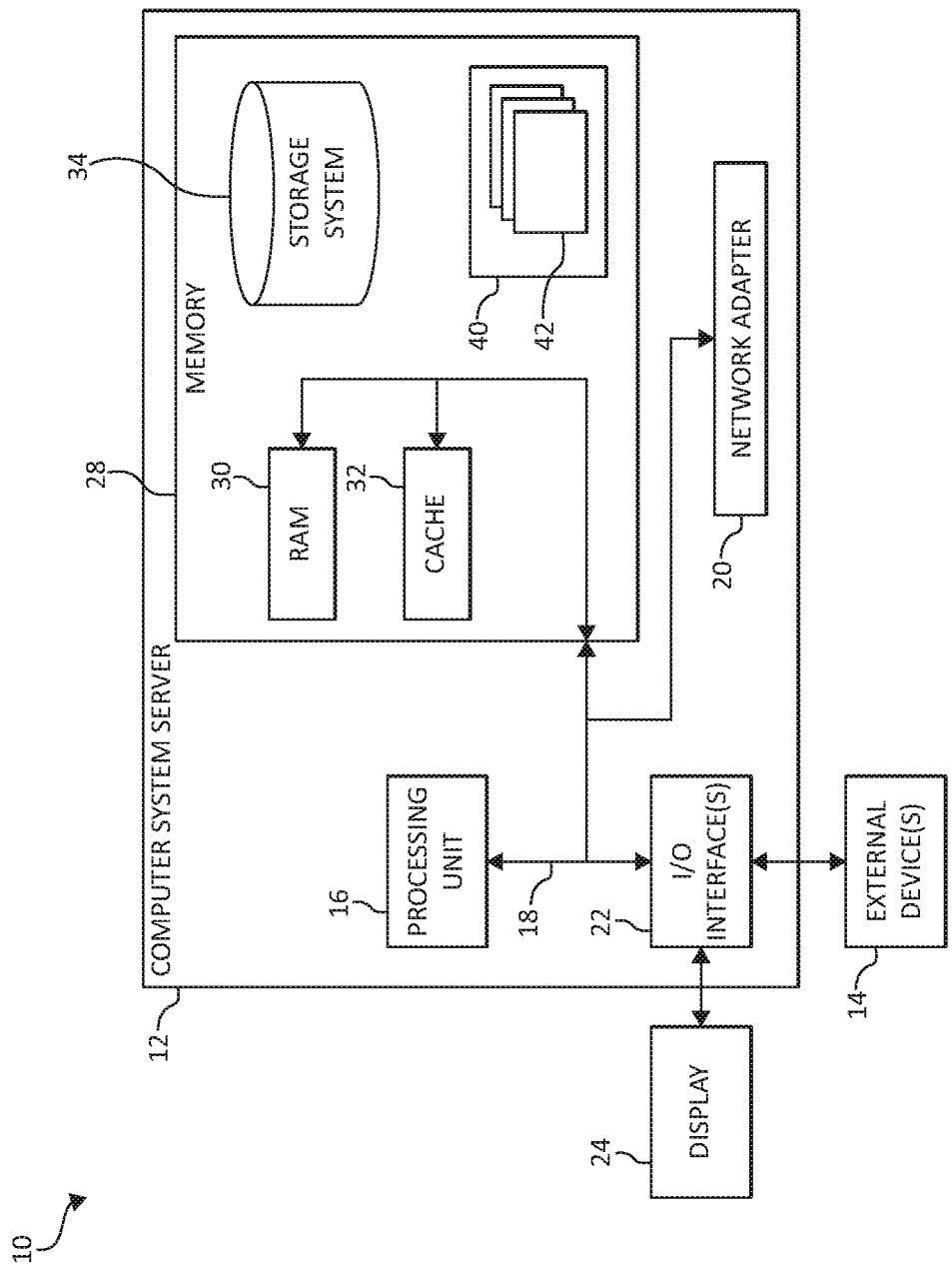
FIG. 1 is a block diagram depicting an exemplary computing node according to an embodiment of the present invention.

As aforementioned, when performing compute-intensive workloads such as data analytics, an effective framework involves distributed parallel computing, which operates to disperse processing tasks across multiple processors operating on one or more computing devices such that parallel processing may be executed simultaneously. Spark™ is a Directed Acyclic Graph (DAG) based computing platform providing a fast and general engine for large-scale data processing. Spark™ introduces a multi-stage (mostly) in-memory computing engine which allows for most computations in memory, as opposed to a disk-based MapReduce computation engine. For this reason, Spark™ may run more efficiently and with increased performance for certain applications. It should be noted that, although this disclosure uses Spark™ throughout as an example to implement the discussed functionality, the mechanisms taught herein are not limited to a particular application nor platform. Rather, the illustrated embodiments of the present invention may be implemented in a wide range of architectures and environments, as one of ordinary skill in the art would appreciate.

Spark™ uses a Resilient Distributed Dataset (RDD) to model the distributed collection of data. RDD indicates a read-only and partitionable distributed dataset, where part or all data of this dataset can be cached in the memory and reused between computations. Using this RDD model, jobs (tasks) are run stage by stage, the stages of which are built up by a DAG scheduler according to the RDD's shuffle dependency. The RDD dependency encompasses a narrow dependency and a wide dependency. In a narrow dependency, each partition of the parent RDD is used by at most one partition of the child RDD partition, which includes two scenarios. One scenario includes partitions of one parent RDD corresponding to partitions of one child RDD, and the second scenario includes partitions of two parent RDD corresponding to partitions of one child RDD. In a wide dependency, partitions of the child RDD depend on all partitions of the parent RDD due to shuffle operations.

Shuffle is a specific phase in the MapReduce framework, which is located between the Map phase and the Reduce phase. If the output results of Map are to be used by Reduce, the output results must be hashed based on the key and distributed to each Reducer. This process is called Shuffle. Shuffle involves the read and write of the disk and the transmission of the network, so that the performance of Shuffle directly affects the operation efficiency of the entire program. Shuffle in Spark™, or DAG-based computing platforms in general, divides a job or task into multiple stages. Shuffle is therefore a mechanism for redistributing data such that it's grouped differently across partitions. During the redistribution, such as the shuffle write or shuffle read phases, the shuffle phase is performed prior to the I/O phase, such that the I/O phase sits at the end/start of the stage task. The target problem is that CPU usage is inefficient during this I/O phase (which is dynamic at runtime) in a given task because the CPU is allocated at a task level, however usage is low during the I/O phase. This makes planning backlog tasks difficult, as resources for job tasks are also dynamic at runtime.

Accordingly, the present invention introduces novel methods for processing tasks in a DAG-based computing platform (e.g., Spark™). These methods include such functionality as, on a driver side, classifying tasks by Input Host Set (IHS), dynamically calculating task I/O and execution cost using information obtained from the DAG, calculating an applied allocation time, and grouping tasks to overlap I/O and CPU execution phases and calculating a delay time. Subsequently, on an executor side, the tasks are executed in accordance with the calculated delay time, such that the CPU is more efficiently used.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
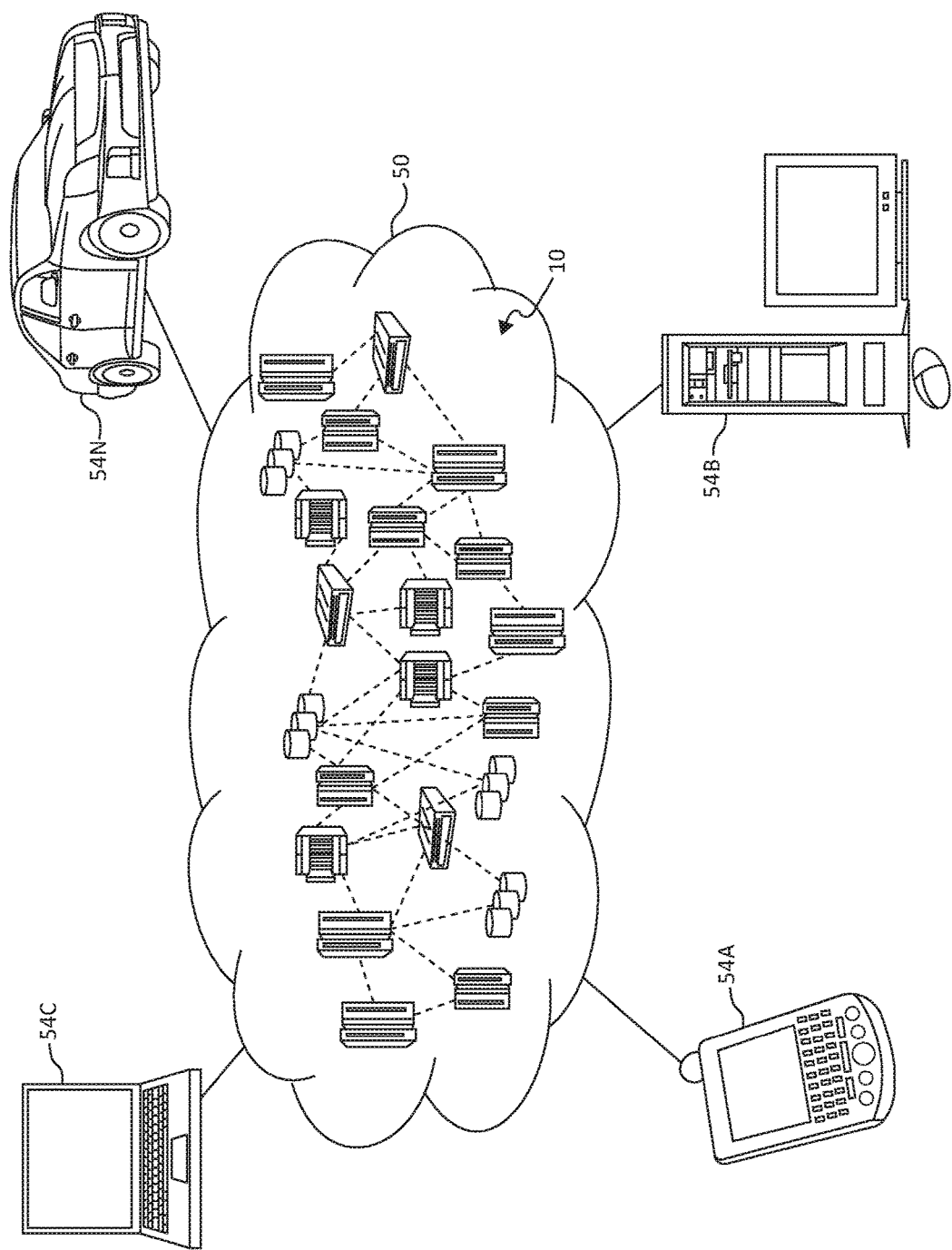
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
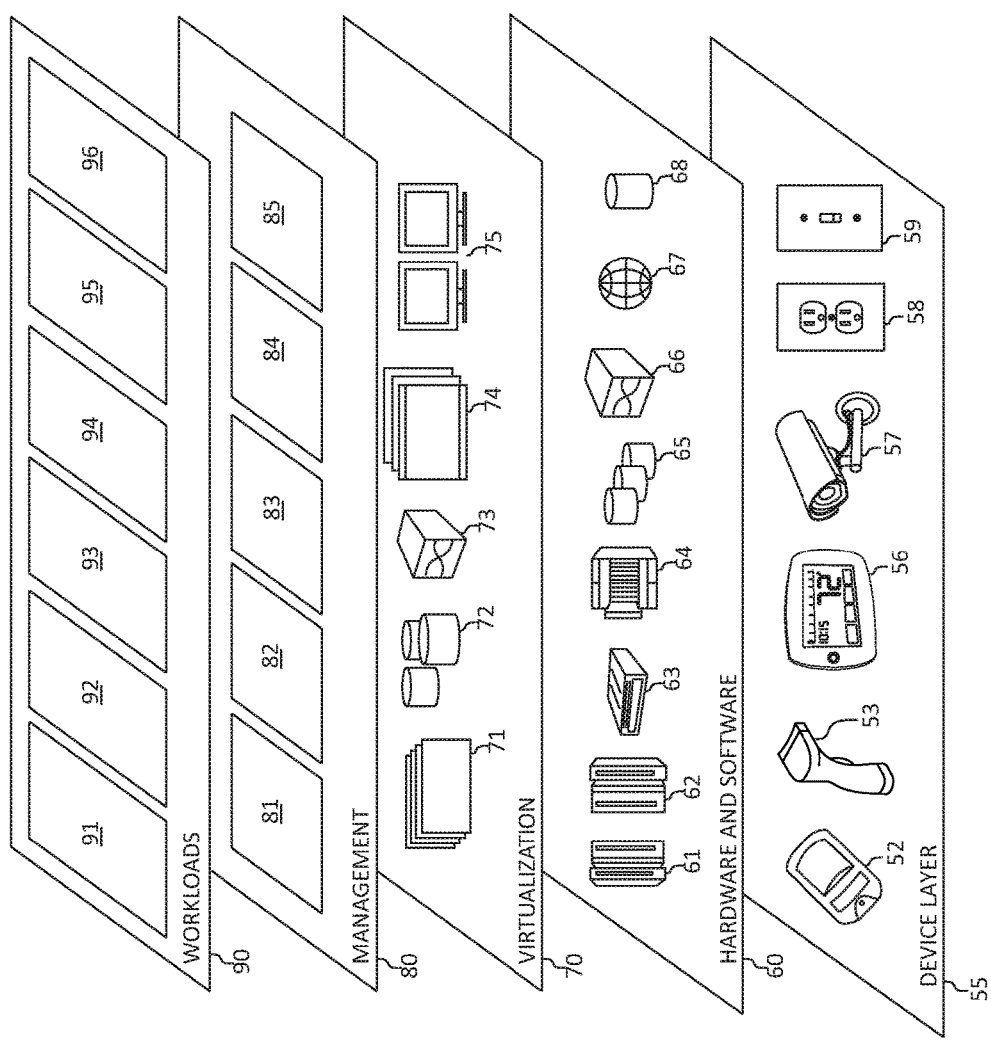
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning and large-scale data processing workloads and functions 96.

Figure 4A:
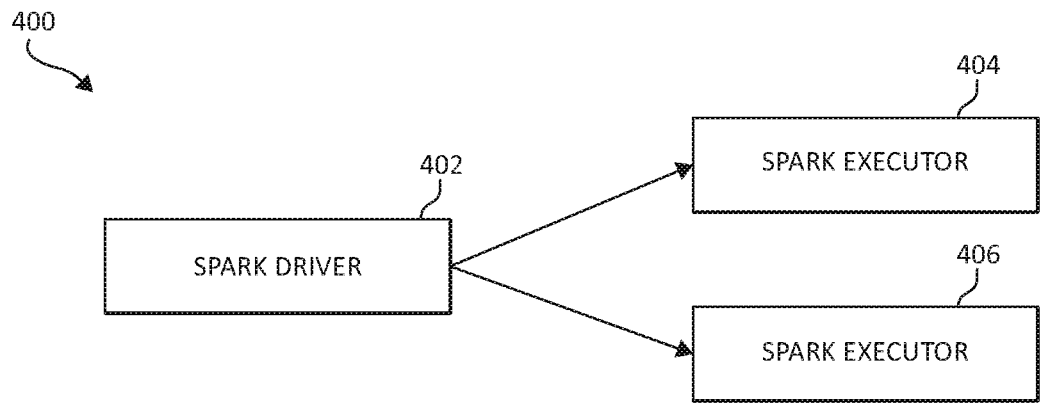
FIG. 4A is a block diagram depicting a high-level execution model of Spark™, in which various aspects of the present invention may be realized.

Turning to FIG. 4A, a block diagram block of a high-level execution model 400 of Spark™ is depicted. A Spark™ application includes of a single driver 402 process and a set of executor 404 and 406 processes distributed across nodes on the cluster. The driver 402 is the process controlling the high-level control flow of requested work. The executor 404 and 406 processes are responsible for executing the work (i.e., tasks). To begin a given job, Spark examines the graph of RDDs on which that action depends and formulates an execution plan. This plan begins with RDDs that do not depend on other RDDs, or reference data which has already been cached; and culminates in the final RDD required to produce the action's results. This execution plan consists of assembling the job's transformations into stages. A stage corresponds to a collection of tasks that all execute the same code, each on a different subset of the data.

Figure 4B:
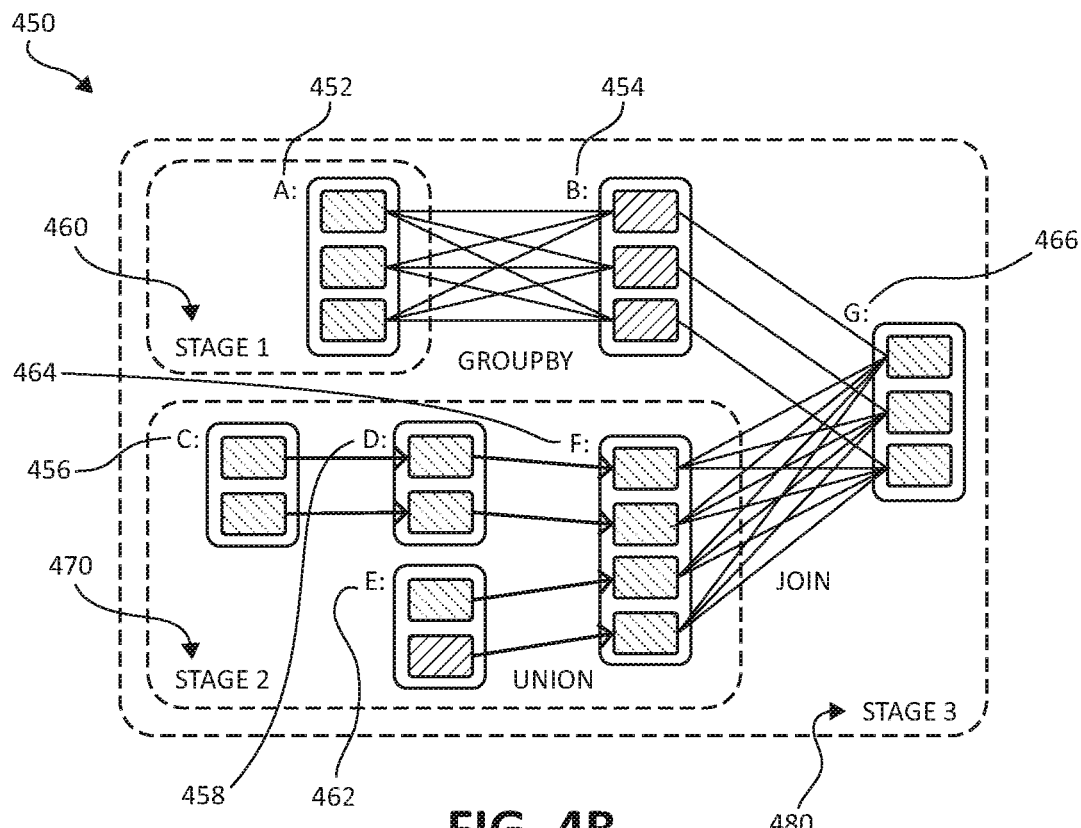
FIG. 4B is a block diagram depicting a transformation graph of stages and corresponding dependencies of tasks within Spark™, in which various aspects of the present invention may be realized.

Continuing to FIG. 4B, a block diagram of a DAG 450 comprising an example of the computation of stages in Spark™ is depicted. DAG 450 includes RDDs in the boxes having solid outline including RDD-A 452, RDD-B 454, RDD-C 456, RDD-D 458, RDD-E 462, RDD-F 464, and RDD-G 466. Each RDD may encompass a narrow or wide dependency and comprises a plurality of partitions therein, including shaded partitions in RDD-B 454 and RDD-E 462 which indicate these partitions are in memory. DAG 450 also illustrates the transformation into job stages as discussed above, including stage 1 (460), stage 2 (470), and stage 3 (480). As depicted, the output RDD (RDD-B 454) of stage 1 (460) is already in memory.

As aforementioned, the mechanisms of the present invention use this computing model to more efficiently process tasks in such an environment. These mechanisms include such functionality as, on a driver side, classifying tasks by IHS, dynamically calculating task I/O and execution cost using information obtained from the DAG, calculating an applied allocation time, and grouping tasks to overlap I/O and CPU execution phases and calculating a delay time. Subsequently, on an executor side, the tasks are executed in accordance with the calculated delay time, such that the CPU is more efficiently used. That is, instead of launching tasks one-by-one, the mechanisms of the present invention package the tasks into groups using IHS and I/O cost characteristics on the driver process, and instruct the executor process how to overlap the I/O and CPU phases to execute the tasks.

First a method is performed on the driver process to determine the task's IHS and dynamically calculate the I/O cost of tasks of different IHSs using a small number of sequential tasks to probe the resource allocation on a new host. This I/O cost is updated each time a task group is completed. A next method, used on the driver process, groups and launches tasks based on an applied allocation time. As will be further discussed below, the applied allocation time is recorded and task groups are defined by timespan or backlog size. A task delay time is then calculated for each task in the task group. Finally, a method on the executor process delays the commencement of each task in the task group based on the correspondent calculated delay time. These methods, when combined, improve CPU efficiency by reusing resource allocations with CPU and I/O overlapping. Additionally, to implement these mechanisms, no changes are needed to be performed to the Spark™ programming model, as this functionality applies to all resource schedulers currently known.

Classifying Tasks by Input Host Set (IHS)

In one embodiment, to classify tasks by IHS, an IHS is determined for each task from a shuffle type and hosts used during previous stage(s). The shuffle type and hosts of the previous stage(s) may be determined by examining information from the DAG. All hosts from the previous stage(s) are maintained or used for the purposes of classifying. Local and network hosts are differentiated and network hosts within the same network are merged together because the network topology is static and can be shared across all jobs. If no topology information exists, it is assumed all hosts are within the same network.

With FIG. 4B and DAG 450 in mind, consider the following example. Assuming there are four hosts in the cluster (H1-H4), of which all are in the same network, and a block in each stage runs on a different one of the four hosts (e.g., partitions within RDD-A 452 each running on H1, H2, H3; partitions within RDD-B 454 each running on H1, H2, H3; partitions within RDD-C 456 each running on H1, H2; ... partitions within RDD-G 466 each running on H1, H2, H3). As can be seen in DAG 450, those blocks having a narrow dependency, such as the one-to-one dependency of RDD-C 456→RDD-D 458 and RDD-B 454→RDD-G 466, may have two IHSs including (local) or (1 network) hosts. Similarly having a narrow dependency, the range dependency of RDD-D 458, RDD-E 462→RDD-F 464 may have two IHSs including (local) or (1 network) hosts. Blocks having a wide dependency, such as RDD-A 452→RDD-B 454 may have one IHS including (local, 2 network) hosts because of their wide dependency. For a combined dependency such as blocks of RDD-B 454, RDD-F 464→RDD-G 466, there may be theoretically four IHSs including: ((1 local), (1 local)); ((1 network), (1 local)); ((1 local), (1 network)); and ((1 network), (1 network)) hosts because of both the narrow dependency of each block of RDD-B 454→RDD-G 466 combined with the wide dependency of each block of RDD-F 464→RDD-G 466. In any case, tasks determined to be within the same IHS are classified or grouped together using this model.

Dynamically Calculating Task I/O Cost

In one embodiment, for dynamically calculating each task's I/O and execution costs using the task's IHS information from the DAG 450, a small number of sequential tasks are used to probe the resource allocation on a new host. This I/O cost is updated each time a task group is completed. This I/O cost calculation is used to build a host record for each IHS of each host. To trigger the task I/O cost calculation, it may be detected that the driver 402 received a new resource allocation. Upon receiving the new resource allocation by the driver 402, a determination is made as to whether a host record exists, and if none exists, a new host record is created in which the host I/O is set to zero (Host_I/O=0). A small number (e.g., one or two) of task(s) are dispatched to retrieve an initial execution and I/O time (cost). Conversely, if a host record does exist, the history record contained in the host record of I/O cost is used for the new allocation.

Another trigger may be additionally used to calculate the task I/O cost upon a task or task group completing execution, in which the resource allocation used for the task or task group is reused. Upon completion of the task(s), a current I/O is calculated which comprises an average task I/O time of the completed task group. The host record is then updated with the new I/O time weighted based on the current I/O time as a function of a previous I/O time according to the formula: Host_newI/O=Host_prevI/O×Weight+Current_I/O×(1−Weight).

Figure 5:
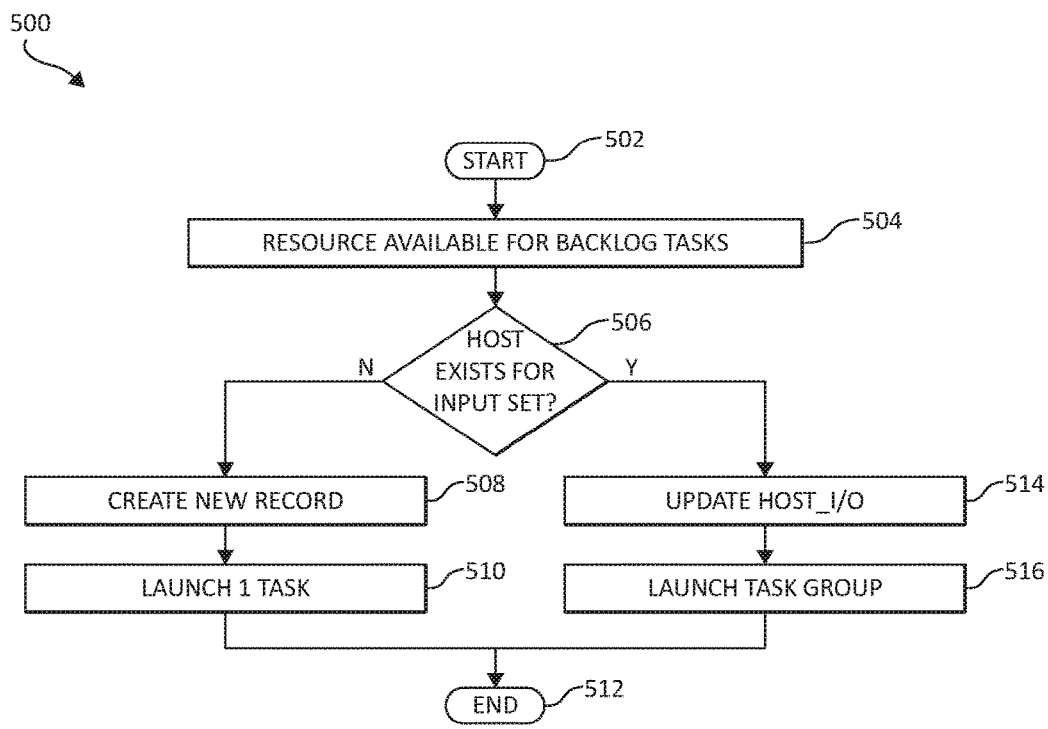
FIG. 5 is a flowchart diagram of an exemplary method for building and updating a host record according to task Input/Output (I/O) cost, in accordance with aspects of the present invention.

These two triggers of I/O cost calculation may be consolidated into the flowchart of FIG. 5 of an exemplary method 500 for building and updating a host record according to task Input/Output (I/O) cost. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Forming a summary discussed above and beginning at step 502, using a resource available for backlog tasks (step 504), a determination is made as to whether a host record exists in a previous resource allocation upon the driver 402 receiving a new resource allocation (step 506). If it is determined no host record exists at step 506, a new host record is created and the Host_I/O is set to equal zero (step 508). A small number of tasks (e.g., 1 or 2) is/are then launched to retrieve an initial execution time (step 510). If, at step 506, it is determined a host record exists or otherwise a task group has completed execution, the current I/O, or average task time of the finished task group, is calculated and the host record is updated with the Host_I/O updating according to the weighted formula above (step 514), and the new task group is launched (step 516). The method 500 ends (step 512).

Grouping Tasks by Applied Allocation Time

In one embodiment, the mechanisms of the present invention group tasks by an applied allocation time (AA-T). The applied allocation time comprises a round trip task time between the driver 402 and a cluster manager (not shown). The period from a request sent to a first resource allocation received is considered the allocation time, where the latest allocation time (most recent) is considered the current allocation time (CA-T). The applied allocation time is a function of the current allocation time weighted with all previous requests for allocation. The weight may be defined variously according to a desired impact of previous round trips. For example, the weight may be defined as weight=0 to use only the most recent allocation time, or weight=0.5 for balancing purposes. The round trip of the first response is recorded as the current allocation time, which then provides the function to calculate the applied allocation time in accordance with the formula: AA-T=AA-Tprev×Weight+ CA-T×(1−Weight).

Figure 6:
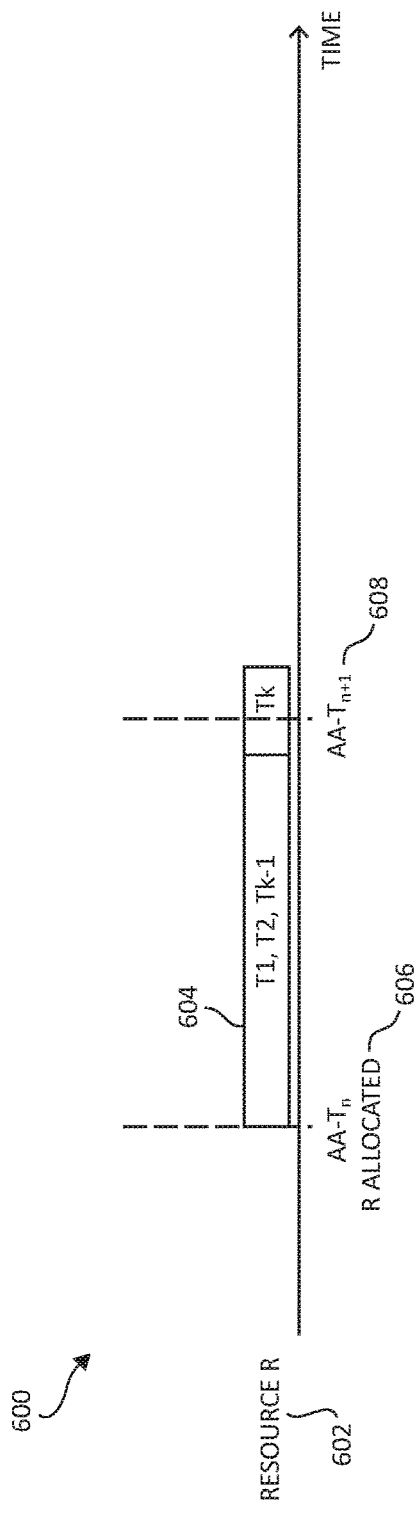
FIG. 6 is a graph diagram depicting a task group timespan to an allocated resource, in accordance with aspects of the present invention.

When determining the grouping of the tasks by the applied allocation time, a group timespan may be targeted to accommodate a task to cross a next applied allocation time checkpoint, where an I/O time of a first task and an execution time of all tasks in the group are included (e.g., task I/O time is 10 ms; execution time is 10 ms; time to the next AA-T checkpoint is 495 ms; group size is upper ((495−10)/10)=49). As an example, FIG. 6 is a graph diagram 600 depicting a task group timespan to an allocated resource of grouping k tasks 604 for resource R 602 at the time when resource R 602 is allocated 606. As can be seen in graph 600, the k tasks 604 are grouped in such a way as to allow the task Tk to cross the next AA-T checkpoint 608 in reference to the timeline associated with the AA-T and the resource allocation of resource R 602.

In one embodiment, the group size of the task groups may be adjusted by a number of tasks in the backlog. In one example, a predefined applied minimal size (AM-S) of a group (e.g., 10 tasks) may be implemented at a cluster level to adjust the group size of the tasks. In another example, if the backlog is less than the AM-S*$Res_{total}$ of the backlog, the AM-S or the actual size of the group may be used to adjust the group size of the tasks.

Calculating Delay and Launching Task Groups

A delay time is calculated for the task groups so as to overlap the I/O and execution (CPU) phases of which more efficiently uses the processor. In one embodiment, a delay time table is calculated from the host record of I/O cost for each IHS. For each IHS of each host, this delay may be calculated according to the formula: $TaskTime_n = Delay_{Tn} + Host_{Tn}I/O + Task_{Tn}ExecTime$; and the formula: $DelayTk = TaskTimek.1 - HostTkI/O$.

Figure 7:
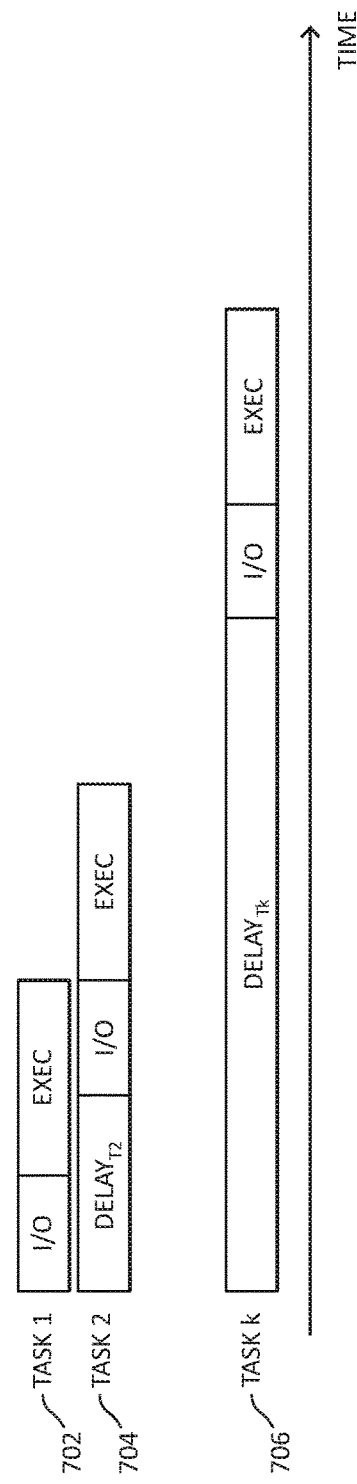
FIG. 7 is a graph diagram depicting a delay time table used for executing tasks, in accordance with aspects of the present invention.

The delay time is calculated according to the prescribed formula at the driver 402 and sent to the executor 404 and 406 together with the given task(s) in the task group, and specifies the delay that should be applied to the task(s) as to overlap the I/O and execution phases upon execution, as seen in graph 700 of FIG. 7. As depicted, task 1 (702), task 2 (704), and task k (706) each have a specified delay time which has been calculated as to overlap the I/O and execution (CPU) phases between tasks (in the task group).

The executor 404 and 406 delays the tasks according to the calculated delay time without changing the user task(s) itself, meaning all characteristics of the task are maintained while only a delay in execution is added. This delay may be implemented as adding a "wait" command prior to executing the actual task, or in another example, may be implemented as an added timer on each host to start a given task in the task group at the desired time.

Figure 8:
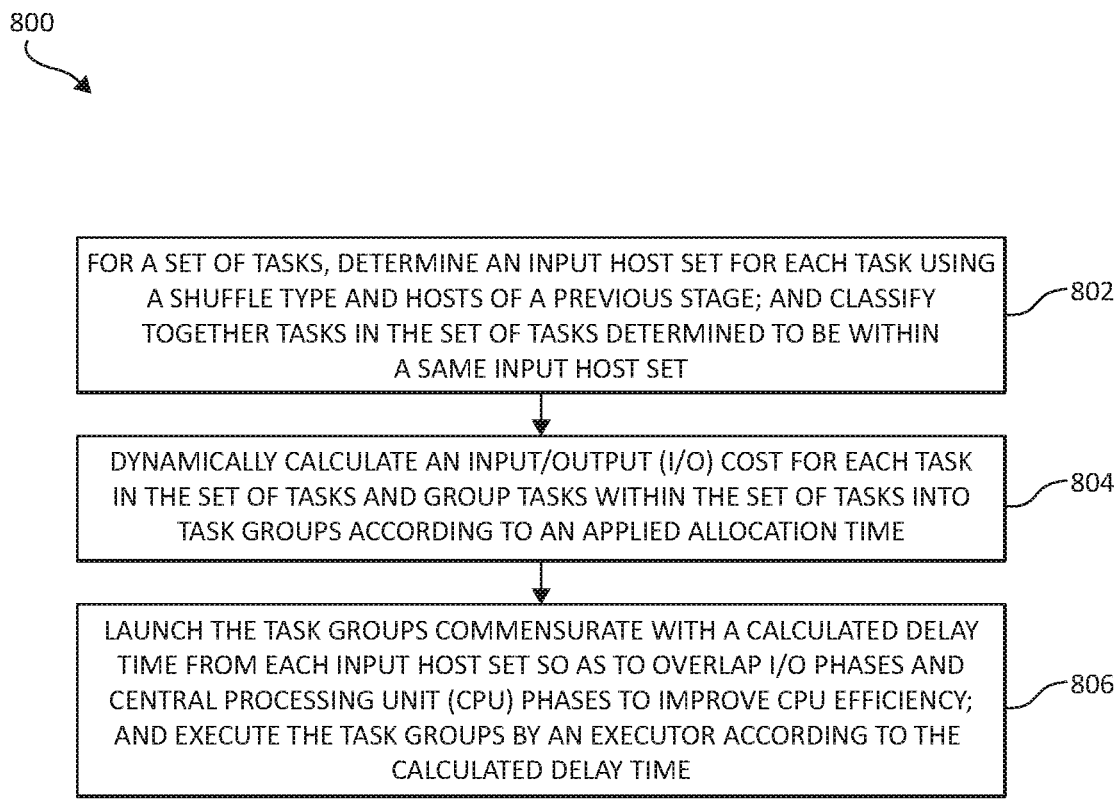
FIG. 8 is a flowchart diagram of an exemplary method for leveraging directed acyclic graph (DAG) information to group tasks for execution by at least one processor device, in accordance with aspects of the present invention.

Concluding with an overview of the functionality of the present invention, FIG. 8 is a flowchart diagram of an exemplary method 800 for leveraging DAG information to group tasks for execution by at least one processor device. The method 800 may be performed in accordance with the present invention in any of the environments depicted in FIGS. 1-3, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

For a set of tasks, an input host set is determined for each task using a shuffle type and hosts used during a previous stage, and the tasks in the set of tasks determined to be within a same input host set are classified together (step 802). An Input/Output (I/O) cost for each task in the set of tasks is calculated and tasks within the set of tasks are grouped into task groups according to an applied allocation time (step 804). The task groups are launched commensurate with a calculated delay time from each input host set so as to overlap I/O phases and central processing unit (CPU) phases to improve CPU efficiency, the launched task groups being executed by an executor according to the calculated delay time (step 806).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for leveraging directed acyclic graph (DAG) information to group tasks for execution, by at least one processor device, comprising:
   for a set of tasks, determining an input host set for each task using a shuffle type and hosts used during a previous stage;
   wherein tasks in the set of tasks determined to be within a same input host set are classified together;
   dynamically calculating an Input/Output (I/O) cost for each task in the set of tasks and grouping tasks within the set of tasks into task groups according to an applied allocation time; and
   launching the task groups commensurate with a calculated delay time from each input host set so as to overlap I/O phases and central processing unit (CPU) phases to improve CPU efficiency; wherein the launched task groups are executed by an executor according to the calculated delay time.

2. The method of claim 1, wherein determining the same input host set further includes:
   obtaining the shuffle type and the hosts used during the previous stage from the DAG;
   maintaining the hosts used during the previous stage; and differentiating local and network hosts; wherein network hosts within a same network are merged.

3. The method of claim 1, further including triggering the dynamically calculated I/O cost for each task within the set of tasks by at least one of:
   detecting that a driver received a new resource allocation; and
   determining one of the task groups has completed executing;
   wherein resources allocated to the completed task group are reused.

4. The method of claim 3, further including generating a host record for each input host set of each of the hosts using the dynamically calculated I/O cost for each task within the set of tasks; and
   updating the host record using an average task I/O time of the completed task group according to a weighted formula.

5. The method of claim 3, wherein the applied allocation time comprises a round trip time between the driver and a cluster manager including a time period from a task request sent to a first resource allocation received, the time period then weighted with all previous task requests.

6. The method of claim 5, further including adjusting a size of the task groups according to a number of tasks in a backlog;
wherein when the backlog is less than a predetermined applied minimal size, an actual group size or the predetermined applied minimal size is used to adjust the size of the task groups.

7. The method of claim 3, further including generating a delay time table using the host record for each input host set; wherein the delay time is calculated by the driver and distributed to the executor with a respective launched task group; and
delaying the respective launched task group by the executor prior to being executed by adding a waiting period prior to performing the tasks within the task group or adding a timer on each host to signal commencement of execution of the tasks within the task group at a desired time based on the delay time.

8. A system for leveraging directed acyclic graph (DAG) information to group tasks for execution, the system comprising:
at least one processor operating within and between distributed computing components, wherein the at least one processor:
for a set of tasks, determines an input host set for each task using a shuffle type and hosts used during a previous stage;
wherein tasks in the set of tasks determined to be within a same input host set are classified together;
dynamically calculates an Input/Output (I/O) cost for each task in the set of tasks and groups tasks within the set of tasks into task groups according to an applied allocation time; and
launches the task groups commensurate with a calculated delay time from each input host set so as to overlap I/O phases and central processing unit (CPU) phases to improve CPU efficiency;
wherein the launched task groups are executed by an executor according to the calculated delay time.

9. The system of claim 8, wherein determining the same input host set further includes:
obtaining the shuffle type and the hosts used during the previous stage from the DAG; maintaining the hosts used during the previous stage; and differentiating local and network hosts; wherein network hosts within a same network are merged.

10. The system of claim 8, wherein the at least one processor triggers the dynamically calculated I/O cost for each task within the set of tasks by at least one of:
detecting that a driver received a new resource allocation; and determining one of the task groups has completed executing;
wherein resources allocated to the completed task group are reused.

11. The system of claim 10, wherein the at least one processor generates a host record for each input host set of each of the hosts using the dynamically calculated I/O cost for each task within the set of tasks; and updates the host record using an average task I/O time of the completed task group according to a weighted formula.

12. The system of claim 10, wherein the applied allocation time comprises a round trip time between the driver and a cluster manager including a time period from a task request sent to a first resource allocation received, the time period then weighted with all previous task requests.

13. The system of claim 12, wherein the at least one processor adjusts a size of the task groups according to a number of tasks in a backlog; wherein when the backlog is less than a predetermined applied minimal size, an actual group size or the predetermined applied minimal size is used to adjust the size of the task groups.

14. The system of claim 10, wherein the at least one processor generates a delay time table using the host record for each input host set; wherein the delay time is calculated by the driver and distributed to the executor with a respective launched task group; and delays the respective launched task group by the executor prior to being executed by adding a waiting period prior to performing the tasks within the task group or adding a timer on each host to signal commencement of execution of the tasks within the task group at a desired time based on the delay time.

15. A computer program product for leveraging directed acyclic graph (DAG) information to group tasks for execution, by at least one processor device, the computer program product embodied on a non-transitory computer-readable storage medium having computer-readable program code portions stored therein, the computer-readable program code portions comprising:
an executable portion that, for a set of tasks, determines an input host set for each task using a shuffle type and hosts used during a previous stage;
wherein tasks in the set of tasks determined to be within a same input host set are classified together; an executable portion that dynamically calculates an Input/Output (I/O) cost for each task in the set of tasks and groups tasks within the set of tasks into task groups according to an applied allocation time; and an executable portion that launches the task groups commensurate with a calculated delay time from each input host set so as to overlap I/O phases and central processing unit (CPU) phases to improve CPU efficiency;
wherein the launched task groups are executed by an executor according to the calculated delay time.

16. The computer program product of claim 15, wherein determining the same input host set further includes: obtaining the shuffle type and the hosts used during the previous stage from the DAG; maintaining the hosts used during the previous stage; and differentiating local and network hosts; wherein network hosts within a same network are merged.

17. The computer program product of claim 15, further including an executable portion that triggers the dynamically calculated I/O cost for each task within the set of tasks by at least one of: detecting that a driver received a new resource allocation; and determining one of the task groups has completed executing; wherein resources allocated to the completed task group are reused.

18. The computer program product of claim 17, further including an executable portion that generates a host record for each input host set of each of the hosts using the dynamically calculated I/O cost for each task within the set of tasks; and an executable portion that updates the host record using an average task I/O time of the completed task group according to a weighted formula.

19. The computer program product of claim 17, wherein the applied allocation time comprises a round trip time between the driver and a cluster manager including a time period from a task request sent to a first resource allocation received, the time period then weighted with all previous task requests.

20. The computer program product of claim 19, further including an executable portion that adjusts a size of the task groups according to a number of tasks in a backlog; wherein when the backlog is less than a predetermined applied minimal size, an actual group size or the predetermined applied minimal size is used to adjust the size of the task groups.

21. The computer program product of claim 17, further including an executable portion that generates a delay time table using the host record for each input host set; wherein the delay time is calculated by the driver and distributed to the executor with a respective launched task group; and an executable portion that delays the respective launched task group by the executor prior to being executed by adding a waiting period prior to performing the tasks within the task group or adding a timer on each host to signal commencement of execution of the tasks within the task group at a desired time based on the delay time.

* * * * *